US011933956B2

(12) United States Patent
Siebenmorgen et al.

(10) Patent No.: US 11,933,956 B2
(45) Date of Patent: Mar. 19, 2024

(54) METHOD AND DEVICE FOR ILLUMINATING A SAMPLE PLANE

(71) Applicant: CARL ZEISS MICROSCOPY GMBH, Jena (DE)

(72) Inventors: Jörg Siebenmorgen, Jena (DE); Ralf Netz, Jena (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 418 days.

(21) Appl. No.: 17/247,210

(22) Filed: Dec. 3, 2020

(65) Prior Publication Data

US 2021/0191097 A1 Jun. 24, 2021

(30) Foreign Application Priority Data

Dec. 4, 2019 (DE) .......................... 102019218912.1

(51) Int. Cl.
*G02B 21/08* (2006.01)
*G02B 21/16* (2006.01)
*G02B 27/42* (2006.01)

(52) U.S. Cl.
CPC .............. *G02B 21/08* (2013.01); *G02B 21/16* (2013.01); *G02B 27/425* (2013.01); *G02B 27/4294* (2013.01)

(58) Field of Classification Search
CPC ...... G02B 21/08; G02B 21/16; G02B 27/425; G02B 27/4294; G02B 5/1871; G02B 21/06; G02B 27/1006
See application file for complete search history.

(56) References Cited

U.S. PATENT DOCUMENTS 8,704,196 B2 4/2014 Kempe et al.
8,969,903 B2* 3/2015 Yamanaka ........... G02B 3/0062
257/79

(Continued)

FOREIGN PATENT DOCUMENTS

DE 102012007045 A1 10/2013
EP 3206070 A1 8/2017

OTHER PUBLICATIONS

Search Report for German Application No. 10 2019 218 912.1, dated Jul. 3, 2020, 10 pages.

*Primary Examiner* — David P Porta
*Assistant Examiner* — Gisselle M Gutierrez
(74) *Attorney, Agent, or Firm* — Brake Hughes Bellermann LLP

(57) ABSTRACT

An illumination apparatus for illuminating a sample plane and a sample that is optionally arranged therein along an illumination beam path includes: a first light source (for outputting light of at least one first wavelength ($\lambda_{photo}$), a second light source for outputting light of at least one second wavelength ($\lambda_{exc}$), and a diffraction grating in the illumination beam path between the first and second light sources and the sample plane. Light of the first wavelength ($\lambda_{photo}$) is not diffracted by the diffraction grating, and light of the second wavelength ($\lambda_{exc}$) is diffracted due to the effect of the diffraction grating. The illumination apparatus can be used in a microscope.

10 Claims, 3 Drawing Sheets

(56) References Cited

U.S. PATENT DOCUMENTS

| | | | |
|---|---|---|---|
| 9,494,782 B2 | 11/2016 | Drescher et al. | |
| 2011/0299083 A1* | 12/2011 | Yokoyama | G01J 3/42 |
| | | | 356/432 |
| 2011/0310475 A1 | 12/2011 | Iketaki | |
| 2015/0077845 A1* | 3/2015 | Langholz | G02B 21/365 |
| | | | 359/388 |
| 2015/0138536 A1* | 5/2015 | Workman | G01J 3/06 |
| | | | 356/334 |

* cited by examiner

METHOD AND DEVICE FOR ILLUMINATING A SAMPLE PLANE

TECHNICAL FIELD

This disclosure relates to an illumination apparatus as per the preamble of the main claim, to a microscope having such an illumination apparatus, and to the use of the illumination apparatus in fluorescence microscopy.

BACKGROUND

In the field of microscopy, in particular, in structured illumination microscopy (SIM), phase diffraction gratings are used, for example, which are arranged in the intermediate image plane or in a plane of the illumination beam path that is conjugate thereto. The alignment and the phase of the illumination modulation in the intermediate image plane can be changed so as make it possible to achieve an increase in resolution in all two-dimensional directions (2D directions) with a high or even maximized signal-to-noise ratio.

SUMMARY

To increase resolution, at least three different (diffraction) directions can be used. When using phase diffraction gratings, also referred to below as diffraction gratings or just gratings for short, at least three gratings with differently directed grating vectors are therefore required.

Alternatively, the structuring of the illumination can be two-dimensional from the start. As a result of this, technical solutions such as optical image field rotators (e.g. an Abbe-Koenig prism), superposed, differently directed gratings on a substrate, optical beam splitting to generate interfering beams, or a plurality of differently directed gratings on a motorized grating changer, which are generally slow and complicated to design, can be dispensed with.

The phase variation of the illumination modulation is typically generated by displacing a grating in the illumination beam path. A plane-parallel plate (also known as a wobble plate) may also be present near the intermediate image on a galvo scanner and moved at a high speed, in particular tilted, so as to realize a phase variation in this way. The phases of the orders of diffraction in a pupil are here coupled to one another. This is also the case if the grating itself is pushed.

The phases of the orders of diffraction, for example, of grating-based SIM microscopes can be modified individually and independently of one another if the orders of diffraction in a pupil plane are influenced independently of one another in their optical path. This can be effected, for example, by means of tiltable plane-parallel glass plates.

The invention is based on the object of proposing a possible illumination, in particular, a possible stimulation and excitation, that is improved over the prior art. An illumination apparatus and the use thereof are additionally proposed.

The object is achieved by the subject matter disclosed herein, including in the claims.

The object is achieved by means of an illumination apparatus for illuminating a sample plane and a sample that is optionally arranged therein along an illumination beam path (also referred to below as beam path for short). The illumination apparatus includes a first light source for outputting light (electromagnetic radiation) of a first wavelength, a second light source for outputting light (electromagnetic radiation, in particular visible (VIS) and near infrared (NIR) radiation) of a second wavelength, and a diffraction grating in the illumination beam path between the first and second light sources and the sample plane.

Light of the first wavelength is not diffracted by the diffraction grating, and light of the second wavelength is diffracted due to the effect of the diffraction grating. The optical properties of the grating and the first and second wavelengths are accordingly selected and coordinated with one another such that the illumination light of the respective wavelength is wavelength-selectively influenced.

In one advantageous development of the illumination apparatus, a predetermined illumination pattern of the light of the second wavelength is generated or able to be generated in the sample plane due to the effect of the diffraction grating.

For example, photostimulation light is intended to propagate as light of the first wavelength through a spatially structured optical element without said optical element affecting the photostimulation light. By contrast, the spatially structured optical element (i.e., the optical structuring element) is intended to exert its desired effect on an excitation light, in particular, a fluorescence excitation light, of the second wavelength. Specifically, for structured illumination microscopy, that means the spatially structured optical element is intended to act as a phase grating and to spatially modulate the excitation light in three dimensions (3D).

For example, the photostimulation light can be used to place an emitter, such as a fluorescence marker, into a state in which it is able to be excited to emit fluorescent light. The photostimulation light acting as the excitation light is used to excite the emitter to emit radiation, for example, fluorescence radiation.

In some embodiments, light of the first wavelength can be used to deexcite or bleach constituent parts of the sample, for example, fluorescence markers.

It may also be the case that, for different fluorescence excitation wavelengths, that is to say, light of a second, up to n-th, wavelength, the optical structuring can element generate the same or different structuring of the respective fluorescence excitation light. The second to n-th wavelengths can differ in this case from the first wavelength. The following text makes reference to light of the second wavelength, but also applies in each case to light of the third to n-th wavelength.

If the second to n-th wavelength is structured in the same way through the effect of the grating, reference is also made to an achromatic effect of the element. In conventional phase diffraction gratings, an achromatic effect can consist in a type of "achromatic" diffraction, that is to say, the location of the orders of diffraction in the far field can be identical for a plurality of different illumination wavelengths because the same diffraction angle can be achieved for different wavelengths in the case of a corresponding design of the grating.

As has already been described, a plurality of second (i.e., second to n-th) wavelengths can be used. It is likewise possible in further embodiments for a plurality of first wavelengths to be simultaneously or sequentially provided and directed into the sample plane.

Possible light sources are preferably lasers, but also correspondingly modified LEDs, OLEDs, and/or other suitable light-emitting elements. The wavelengths can be selected by means of the type of light source and/or by means of filters arranged downstream of the light source or light sources. If only one light source is used, out of whose provided spectrum the corresponding first and second wavelengths are extracted by means of filtering, this light source can be considered according to be the first light source or the second light source depending on the wavelength currently being used, that is to say, can perform a technical dual function.

The light of the first wavelength (photostimulation light $\lambda_{photo}$) can be incident on the optical structuring element in the form of a point or an area. In some embodiments, the light of the first wavelength can already be spatially structured. Such spatial structuring can be performed, for example, by means of a spatial light modulator (SLM). The spatial structuring of the light can already have taken place before it is incident on the grating and with a pattern differing from the structuring effect of the optical structuring element.

In a further embodiment of the illumination apparatus, a plurality of gratings can be present, where one is, or can be, introduced in each case into the beam path. The gratings can be pushed or pivoted into the beam path. For this purpose, they can be arranged on a slide or a wheel, for example. If different gratings are able to be pushed or pivoted into an illumination apparatus, it is correspondingly also possible for a plurality of combinations of light of a first wavelength and light of a second to n-th wavelength to be used. The illumination apparatus thus can be used for a wide selection of emitters, in particular, fluorophores, and can be adapted and/or retrofitted if required by interchanging the grating and adapting the wavelengths used.

In an embodiment, the optical structuring element can be located in a beam path that is traversed both by photostimulation light as light of the first wavelength ($\lambda_{photo}$) and by excitation light as light of the second wavelength ($\lambda_{exc}$).

If the optical structuring element is a phase object, it is intended to realize phase functions determined in dependence on the wavelength $\lambda$, where the desire here is in particular that the phase function for the photostimulation light wavelengths $\lambda_{photo}$ has no location dependency ($\varphi(x,y, \lambda_{photo})$=const.) and is constant except for spatially arbitrarily occurring $2\pi$ phase jumps ($\varphi(x,y, \lambda_{photo})$=m·$2\pi$·∫∫dx dy $\Sigma_{ij}\delta$ (x-$x_i$, y-$y_j$)). In this case, $x_i$ or $y_j$ can be randomly distributed. By contrast, the location-dependent phase function $\varphi(x,y, \lambda_{exc})$ for the excitation light is not constant.

More details regarding the description and determination of a spatial phase structure element with different or the same effect for different wavelengths can be found in German patent application DE 10 2018 113 054, (which is incorporated herein by reference), which does not relate to the case of a constant phase function and is not dealt with in combination with photostimulation light either.

The illumination apparatus can be a constituent part of a microscope, in particular, of a fluorescence microscope.

The two beam paths, i.e., of light of the first and the second wavelengths, that is to say, the stimulation and excitation beam paths, can be combined, for example, dichroically, or in a polarization-dependent manner.

The photostimulation (see FIG. 1, for example) can take place in one dimension (1D, galvo scanner) or in two dimensions (2D; 2× galvo scanners, SLM-based). The 2D implementation can also apply the illumination pattern in the embodiment having an SLM simultaneously, with a short duration of action and, if desired, simultaneously (parallel) to the image recording, i.e., parallel to capturing detection radiation. The phase and/or amplitude patterns to be produced can be kept available in the SLM or a corresponding storage unit. The first light source (for example, a laser) can be switched in the μs range (using an acousto-optical filter (AOTF)) or in the sub-ns range (using injection current regulation). The SLMs can be primarily (pixelated) phase modulators (LCoS—Liquid Crystal on Silicon) and/or amplitude modulators (DMD—Digital Micromirror Device), which can be arranged in an intermediate image or a pupil of the beam path. In pixelated modulators, the pixels are switchable independently of one another. This ability of the pixels to be switched independently of one another permits the parallelized use of the modulators already mentioned above. In fluorescence microscopy, the parallelized use of a modulator is frequently linked to a desired multi-color photostimulation illumination (at least two colors). A plurality of colors means a plurality of wavelengths of the photostimulation light $\lambda_{photo}$, with the result that the different wavelengths are to be structured in a desired manner by different modulator regions (spatial modulator separation).

The illumination apparatus can be used to change a first property of an emitter in accordance with the illumination pattern of the first wavelength produced in the sample plane and to change a second property of the emitter by means of the light of the second wavelength.

The light of the first wavelength can be used for example to place an emitter into an activated state and the light of the second wavelength can be used to place it into an excited state. In the examples that have been mentioned until now, the ability to be excited to emit was mentioned as the first property and the excitation to emit as the second property. The actual emission of radiation, for example, of fluorescent light, can optionally also be included in the second property. Alternatively, an emitter can be deexcited or bleached, for example.

In more general terms, the illumination apparatus can be used in a method for illuminating a sample plane and a sample that is optionally arranged therein along an illumination beam path using light of a first wavelength and using light of a second wavelength.

The use of a diffraction grating as described above in an illumination apparatus offers a number of advantages. One significant advantage is that diffraction gratings cause significantly fewer intensity losses of excitation light of different wavelength than is the case for example for solutions with filters or filter gratings, which act substantially as location-dependent filters and can cause losses there of up to 50%. Diffraction gratings used as described herein effect a phase modulation of the influenced excitation light. They can consist of only one material, the surface of which is correspondingly structured during production. The design possibilities of such diffraction gratings are significantly greater compared to filters, in particular, compared to multilayer filters. In contrast to diffraction gratings, filters, for example, are typically built from a plurality of layers that must be applied one on top of the other in a complex manner and the design possibilities of which for example with respect to the surface structure are fewer for a comparable technological outlay.

BRIEF DESCRIPTION OF THE DRAWINGS

The invention will be explained in more detail below on the basis of figures and exemplary embodiments. In the drawings.

DETAILED DESCRIPTION

Figure 1:
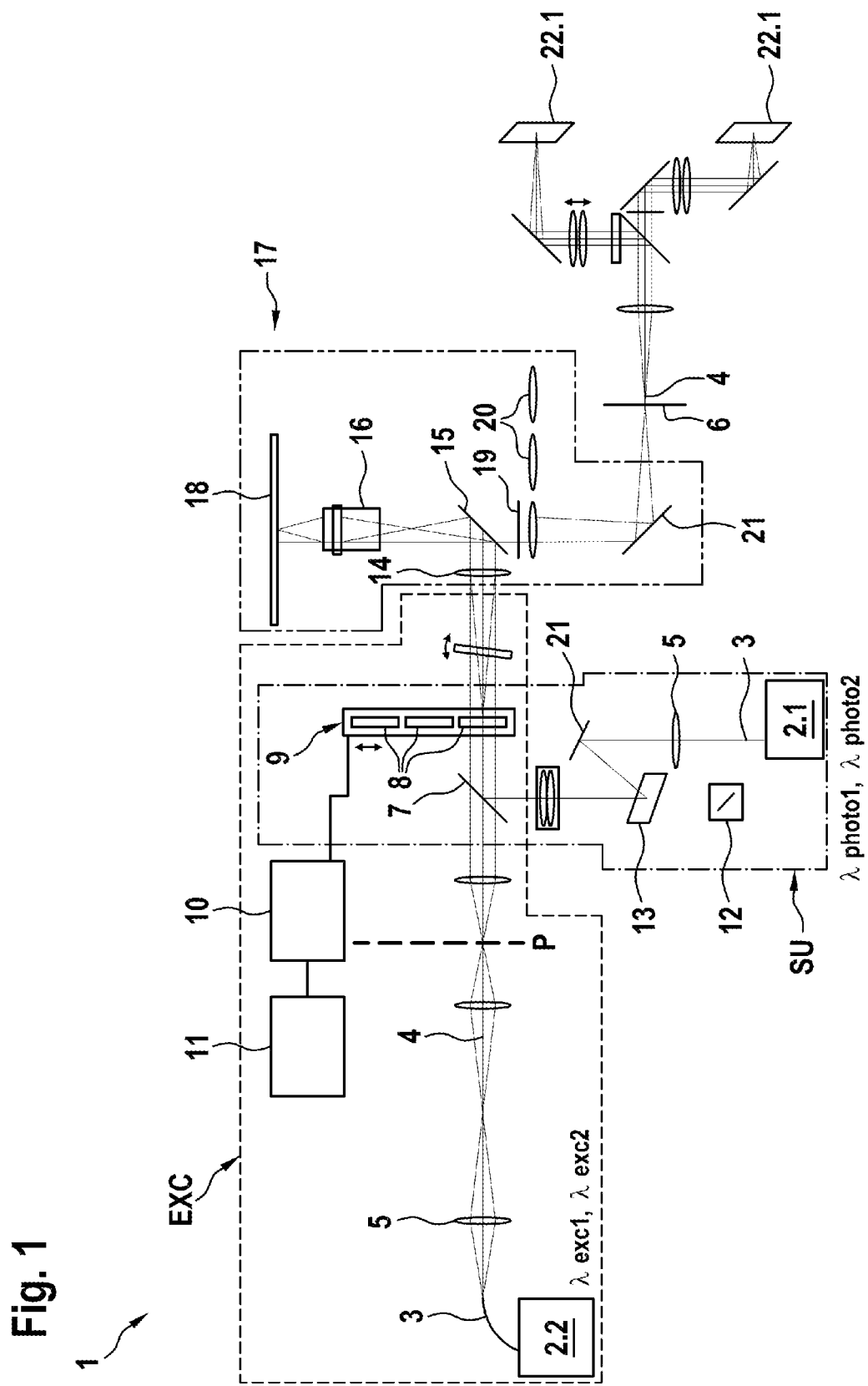
FIG. 1 shows an exemplary embodiment of a microscope having an illumination apparatus.

FIG. 1 shows a microscope 1 having an illumination apparatus as an exemplary embodiment. The microscope 1 has a photostimulation unit SU for providing excitation light of at least one first wavelength $\lambda_{photo}$ and a unit ZEXC for providing excitation light of at least one second wavelength $\lambda_{exc}$.

A second light source 2.2 for providing light of at least one second wavelength $\lambda_{exc}$ (symbolized by the reference signs carrying indices $\lambda_{exc1}$, $\lambda_{exc2}$) is present in the unit EXC. The light of the second wavelength kn $\lambda_{exc}$ is coupled into a light-guiding fiber 3 and guided in a beam path 4. A collimator 5 is arranged downstream of the fiber 3 to focus the light beam that diverges at the end of the fiber 3.

Following this, a pupil plane P and a further collimator 5 for producing a collimated beam are arranged in the beam path 4. In the region of said collimated beam, a beam combiner 7 is arranged, as a result of whose effect light of the photostimulation unit SU is coupled or can be coupled into the beam path 4.

The light of the first wavelength $\lambda_{photo}$ travels from the first light source 2.1, again via a light-guiding fiber 3, to a collimator 5 and is steered onto a spatial light modulator (SLM) 13 or alternatively onto a scanner 12 by means of a mirror 21. The spatial light modulator 13 can be in the form of a LCoS-SLM (Liquid Crystal on Silicon) and the scanner in the form of a galvo scanner. From the spatial light modulator 13 or the scanner 12, the light of the first wavelength $\lambda_{photo}$ travels via an optical lens system to the beam combiner 7.

From the beam combiner 7, light of the first and the second wavelength $\lambda_{photo}$, $\lambda_{exc}$, propagates along a common beam path 4. In each case, a wavelength-selective grating 8 is able to be pushed into the beam path 4. In the exemplary embodiment, a plurality of wavelength-selective gratings 8 are arranged as a grating group 9 on a slide whose movement can be controlled by means of a drive 10. The drive 10 is connected to a control unit 11 and is actuatable by means of the latter. Using the control unit 11, it is also possible to control, or to be able to control, for example, the first and the second light sources 2.1 and 2.2, the spatial light modulator 13 and/or the scanner 12, and movements of any wobble plates/phase shifters that are present and/or displaceable tube lenses (20) (see below).

A phase shifter (wobble plate) and a tube lens 14 are arranged downstream of the grating group 9. The illumination light of the first wavelength $\lambda_{photo}$ or of the second to n-th wavelength $\lambda_{exc}$ passes via a dichroic beam splitter 15 to an objective 16 and is focused by its effect into a sample plane 17 in which a sample 18 is arranged. An optional provision of light of different first wavelengths is symbolized by the reference signs carrying indices $\lambda_{photo1}$, $\lambda_{photo2}$.

The sample 18 is provided with at least one emitter that is activated by the effect of the light of the first wavelength $\lambda_{photo}$ and is excited by the effect of the light of the second wavelength $\lambda_{exc}$ and emits fluorescent light.

Fluorescent light brought about in this way is captured by means of the objective 16 and passes into a detection beam path via the dichroic beam splitter 15, which is transmissive to the wavelength of the fluorescent light. A filter 19 and optionally selectable tube lenses 20 are present in said detection beam path. The tube lenses can be moved into the detection beam path according to the captured wavelengths of the fluorescent light. The fluorescent light (i.e., detection radiation) passes via a mirror 21 to a downstream system of beam splitters 15, fixed and/or displaceable optical lenses, mirrors 21, and optional filters 19. Said system steers the corresponding components of the detection radiation onto a first detector 22.1 or onto a second detector 22.2.

The exemplary embodiment shown in simplified form in FIG. 1 relates to the use of the spatial phase structure element (e.g., wavelength-selective grating 8) in a combination device including an SIM microscope 1 and a photostimulation unit SU. The SIM microscope 1 has a spatially structuring phase element (e.g., wavelength-selective grating 8) with a 1D or 2D grating structure that does not affect the photostimulation wavelengths $\lambda_{photo}$.

Figure 2:
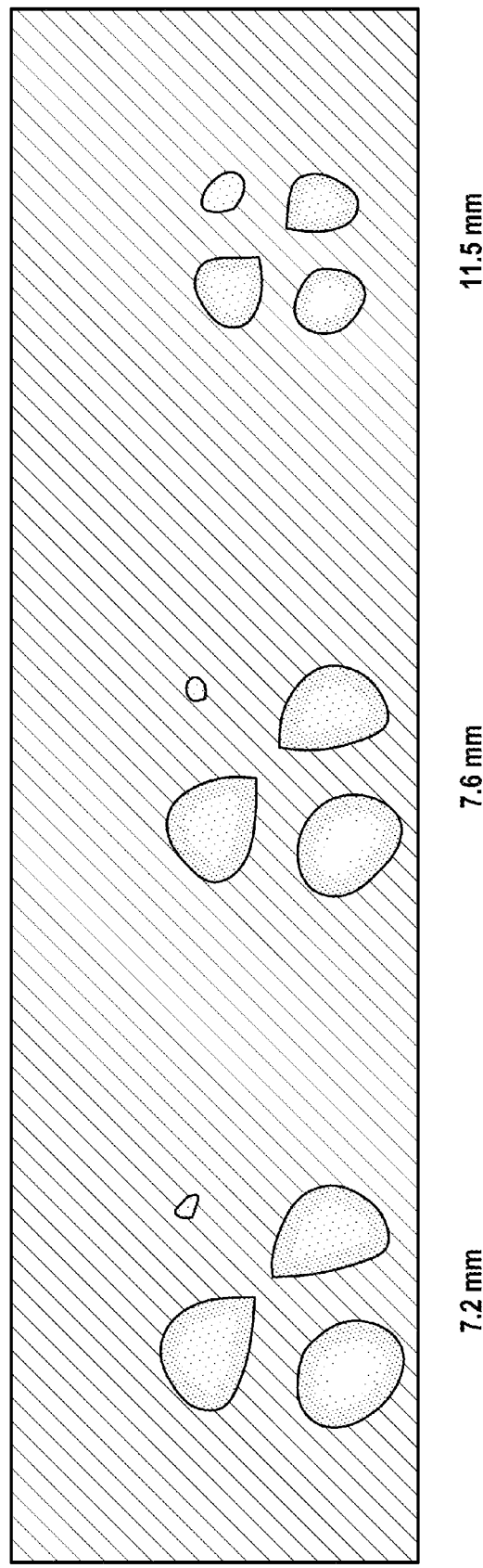
FIG. 2 shows examples of point spread functions (PSF) that are not according to the invention for objectives with objective pupil diameters of 7.2 mm, 7.6 mm, and 11.5 mm of a photostimulation light $\lambda_{photo}$=488 nm after interaction with a 27.5 μm 2D phase diffraction grating in the object plane of the objective.

FIG. 2 shows the case that the 2D grating (structuring spatial phase element) of a microscope Elyra7 (Carl Zeiss Microscopy GmbH) interacts with the photostimulation light $\lambda_{photo}$=488 nm, for example, of a photostimulation module SU based on a galvo scanner. It can be seen from FIG. 2 that the respectively shown point spread function (PSF) is broken up. In order to prevent such a destruction of the PSF, a phase grating or the entire grating group in an illumination apparatus according to the prior art would have to be moved out of the beam path to perform a photostimulation event. However, this causes the overall experiment consisting of image and photostimulation event sequences to be extremely slow.

Figure 3:
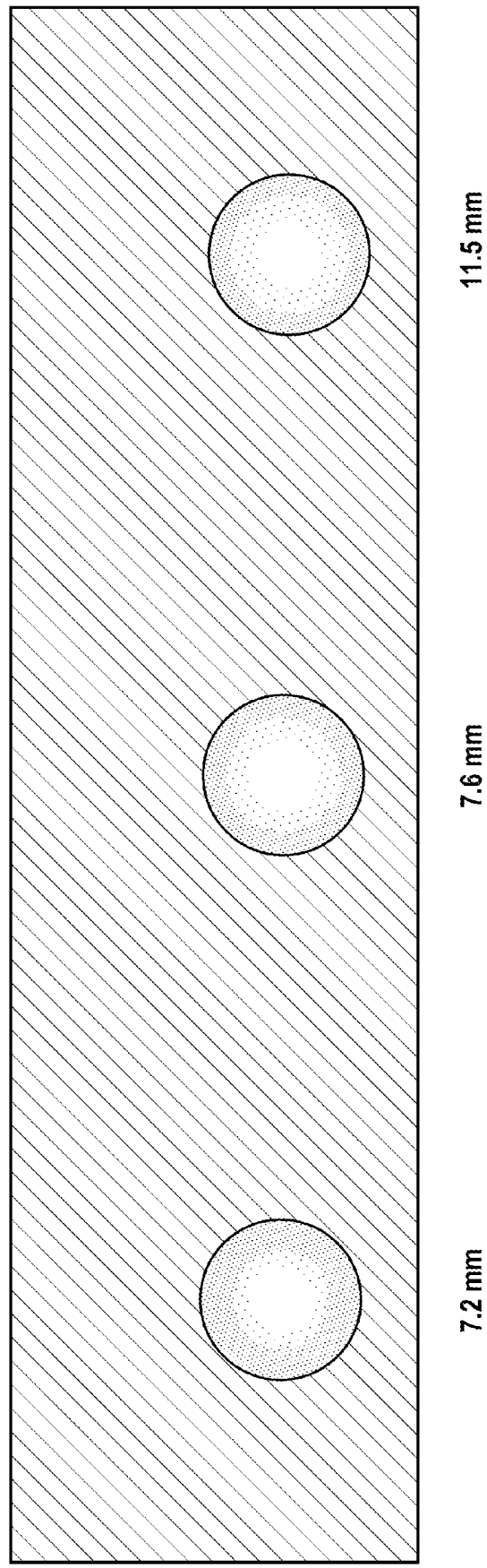
FIG. 3 shows examples of point spread functions (PSF) according to the invention for objectives with objective pupil diameters of 7.2 mm, 7.6 mm, and 11.5 mm of a photostimulation light $\lambda_{photo}$=488 nm after interaction with a 27.5 µm 2D phase diffraction grating in the object plane of the objective.

However, as shown in FIG. 3, when using the techniques described herein, the point spread function is not destroyed (FIG. 3) and the wavelength-selective grating 8 or the grating group 9 does not need to be removed from the beam path 4 during the photostimulation event sequences, thus leading to a greater speed and better time resolution during image recording.

REFERENCE SIGNS

1 Microscope
2.1 First light source
2.2 Second light source
3 Fiber
4 Beam path
5 Collimator
6 Pinhole stop
7 Beam combiner
8 Wavelength-selective grating
9 Grating group
10 Drive
11 Control unit
12 Scanner
13 SLM
14 Tube lens
15 Beam splitter
16 Objective
17 Sample plane
18 Sample
19 Filter
20 Tube lenses displaceable
21 Mirror 22.1 First detector
22.2 Second detector
P Pupil plane
SU Photostimulation unit
EXC Unit for providing excitation light

The invention claimed is:

1. An illumination apparatus for illuminating a sample plane and a sample that is arranged therein along an illumination beam path, the apparatus comprising:
    a first light source configured for outputting light of at least one first wavelength (λ.sub.photo);
    a second light source configured for outputting light of at least one second wavelength (λ.sub.exc); and
    a diffraction grating disposed in the illumination beam path between the first and second light sources and the sample plane,
    wherein light of the first wavelength (λ.sub.photo) is not diffracted by the diffraction grating and light of the second wavelength (λ.sub.exc) is diffracted due to the diffraction grating.

2. The illumination apparatus according to claim 1, wherein the diffraction grating is configured to generate a predetermined illumination pattern of the light of the second wavelength ($\lambda_{exc}$) in the sample plane.

3. The illumination apparatus according to claim 2,
    wherein the light of the first wavelength ($\lambda_{photo}$) is selected for changing a first property of an emitter in the sample, and
    wherein light of the second wavelength ($\lambda_{exc}$) is selected for changing a second property of the emitter.

4. The illumination apparatus according to claim 3, wherein the light of the first wavelength ($\lambda_{photo}$) is selected to place the emitter into an activated state and the light of the second wavelength ($\lambda_{exc}$) is selected to place the emitter into an excited state.

5. The illumination apparatus according to claim 4, wherein the emitter fluoresces in the excited state.

6. The illumination apparatus according to claim 3, wherein the light of the first wavelength ($\lambda_{photo}$) is selected to place the emitter into a deexcited or bleached state.

7. A microscope comprising:
    a first light source configured for outputting light of at least one first wavelength (λ.sub.photo) to illuminate a sample plane and a sample that is arranged therein along an illumination beam path;
    a second light source configured for outputting light of at least one second wavelength (λ.sub.exc) to illuminate the sample plane;
    a diffraction grating disposed in the illumination beam path between the first and second light sources and a sample plane, wherein light of the first wavelength (λ.sub.photo) is not diffracted by the diffraction grating and light of the second wavelength (λ.sub.exc) is diffracted due to the diffraction grating; and
    a detector configured for detection of light emitted from the sample in response to the light of the at least one second wavelength that illuminates the sample plane.

8. The microscope of claim 7, wherein the diffraction grating is configured to generate a predetermined illumination pattern of the light of the second wavelength ($\lambda_{exc}$) in the sample plane.

9. A method comprising: illuminating a sample plane and a sample that is arranged therein along an illumination beam path with light of a first wavelength (λ.sub.photo); illuminating the sample plane and the sample that is arranged therein along the illumination beam path with light of a second wavelength (λ.sub.exc), diffracting, with a diffraction grating in the illumination beam path, light of the second wavelength (λ.sub.exc) but not diffracting the light of the first wavelength (λ.sub.photo) with the diffraction grating.

10. The method of claim 9, wherein diffracting, with the diffraction grating in the illumination beam path, light of the second wavelength ($\lambda_{exc}$) generates a predetermined illumination pattern of the light of the second wavelength ($\lambda_{exc}$) in the sample plane.

* * * * *